(12) United States Patent
Kawamoto et al.

(10) Patent No.: US 10,680,666 B2
(45) Date of Patent: Jun. 9, 2020

(54) TIMING ESTIMATION DEVICE AND TIMING ESTIMATION METHOD

(71) Applicant: MITSUBISHI ELECTRIC CORPORATION, Tokyo (JP)

(72) Inventors: Takeshi Kawamoto, Tokyo (JP); Takehiko Nishide, Tokyo (JP); Koji Tomitsuka, Tokyo (JP); Masatsugu Higashinaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/480,963

(22) PCT Filed: Feb. 27, 2017

(86) PCT No.: PCT/JP2017/007349
§ 371 (c)(1),
(2) Date: Jul. 25, 2019

(87) PCT Pub. No.: WO2018/154753
PCT Pub. Date: Aug. 30, 2018

(65) Prior Publication Data
US 2019/0393910 A1     Dec. 26, 2019

(51) Int. Cl.
*H03D 1/06*     (2006.01)
*H03D 11/04*    (2006.01)
(Continued)

(52) U.S. Cl.
CPC ............... *H04B 1/06* (2013.01); *H04B 7/005* (2013.01); *H04L 25/03292* (2013.01); *H04L 27/2647* (2013.01); *H04W 24/08* (2013.01)

(58) Field of Classification Search
CPC .... H04B 1/06; H04B 1/7113; H04B 1/71637; H04B 7/005; H04L 25/03292;
(Continued)

(56) References Cited

U.S. PATENT DOCUMENTS 5,809,086 A    9/1998  Ariyavisitakul
6,731,622 B1 *  5/2004  Frank .................... G01S 5/0215
                                                370/342
(Continued)

FOREIGN PATENT DOCUMENTS

JP     2005-333300 A    12/2005

OTHER PUBLICATIONS

Extended European Search Report for European Application No. 17897479.6, dated Nov. 18, 2019.

*Primary Examiner* — Phuong Phu
(74) *Attorney, Agent, or Firm* — Birch, Stewart, Kolasch & Birch, LLP

(57) ABSTRACT

A timing estimation device according to the present invention includes a received signal memory that outputs a plurality of sample groups each of which is a first number of samples extracted at symbol rate intervals from an oversampled received signal containing a known sequence, with shifting their leading positions by one sample from each other, a reliability calculation unit that calculates a channel impulse response for each of the sample groups, based on the sample group, generates a replica of the received signal using the channel impulse response and the known sequence, and calculates a reliability value based on the sample group, the replica, and the channel impulse response, and a timing estimation unit that estimates a preceding wave arrival timing and a delayed wave arrival timing, based on the reliability value.

16 Claims, 14 Drawing Sheets

(51) Int. Cl.
*H03K 5/01* (2006.01)
*H03K 6/04* (2006.01)
*H04B 1/10* (2006.01)
*H04L 1/00* (2006.01)
*H04L 25/08* (2006.01)
*H04B 1/06* (2006.01)
*H04L 25/03* (2006.01)
*H04W 24/08* (2009.01)
*H04B 7/005* (2006.01)
*H04L 27/26* (2006.01)

(58) Field of Classification Search
CPC .. H04L 25/0212; H04W 24/08; G01S 5/0215; G01S 5/0221
USPC .......................... 375/348, 346, 343, 316, 340
See application file for complete search history.

(56) References Cited

U.S. PATENT DOCUMENTS

| | | | |
|---|---|---|---|
| 7,356,100 B2* | 4/2008 | Molisch | H04B 1/71637 375/136 |
| 7,822,098 B2* | 10/2010 | Sahinoglu | G01S 5/0221 375/130 |
| 2004/0052304 A1* | 3/2004 | Reial | H04B 1/7113 375/148 |
| 2004/0139466 A1* | 7/2004 | Sharma | H04B 1/7113 725/72 |
| 2009/0103640 A1* | 4/2009 | Chen | H04L 25/0212 375/260 |
| 2011/0013685 A1 | 1/2011 | McKown | |
| 2014/0376670 A1 | 12/2014 | Wu et al. | |
| 2016/0306027 A1* | 10/2016 | Chrabieh | G01S 5/0215 |

\* cited by examiner

TIMING ESTIMATION DEVICE AND TIMING ESTIMATION METHOD

FIELD

The present invention relates to a timing estimation device and a timing estimation method for estimating the arrival timings of a preceding wave and a delayed wave in a received signal.

BACKGROUND

In a wireless communication system, a transmitted radio wave may arrive at a receiving apparatus through two or more paths. The receiving apparatus receives two or more incoming waves that have arrived through the two or more paths, at timings depending on their respective paths. This may cause intersymbol interference. Intersymbol interference means that adjacent symbols are affected by each other. Since communication quality is degraded by intersymbol interference, a receiving apparatus generally uses an equalizer for minimizing intersymbol interference. An equalizer that performs equalization in a time domain determines the position of each incoming wave in a received signal, that is, the timing of each incoming wave, and determines a preceding wave timing that is the arrival timing of a leading wave that is a wave arriving at the earliest time, and a most-delayed wave timing that is a timing of a most-delayed wave that is a wave arriving at the latest time. Then, the equalizer estimates a length between the preceding wave timing and the most-delayed wave timing, that is the spread of delay, and sets a timing of performing equalization and a tap length using the spread of delay. When the receiving apparatus can accurately estimate the spread of delay, it can appropriately set the timing of performing equalization and the tap length, and as a result, can improve the communication quality. For this reason, accurately estimating the timings of incoming waves has been a certain challenge.

Conventional techniques for estimating the timings of incoming waves include a technique described in Patent Literature 1. In a communication system in which a known sequence such as a synchronization symbol string or a training signal is contained in a frame, a synchronization detection circuit described in Patent Literature 1 delays a received signal symbol by symbol using a shift register, performs a convolution operation on an input signal and the known sequence, that is, an operation to obtain the cross-correlation between the input signal and the known sequence, and successively outputs a correlation value resulting from this operation. The synchronization detection circuit described in Patent Literature 1 detects a position at which the correlation value is largest, and sets the detected position as a synchronization timing, that is, the position of a main wave. The synchronization detection circuit described in Patent Literature 1 estimates a delay profile by regarding, as a delayed wave, one whose correlation value is relatively large among the calculated correlation values other than the main wave.

CITATION LIST

Patent Literature

Patent Literature 1: Japanese Patent Application Laid-open No. 2005-333300

SUMMARY

Technical Problem

However, the technique described in Patent Literature 1 estimates the timings of incoming waves using cross-correlation. Consequently, when there is a difference in electric power between incoming waves, the estimation accuracy of the timing of an incoming wave having low electric power is degraded. Therefore, this leads to a problem that it is difficult to accurately estimate the spread of delay.

The present invention has been made in view of the above circumstances. It is an object of the present invention to provide a timing estimation device capable of preventing degradation of the accuracy of estimating the timings of incoming waves even in an environment where there is a power difference between the incoming waves.

Solution to Problem

In order to solve the above-described problem and achieve the object, the present invention provides a timing estimation device comprising: a received signal output unit to output a plurality of sample groups each of which is formed of a first number of samples extracted at symbol rate intervals from an oversampled received signal containing a known sequence, with shifting leading positions of the sample groups by one sample each; a reliability calculation unit to calculate a channel impulse response for each of the plurality of sample groups, based on the sample group, generate a replica of the received signal using the channel impulse response and the known sequence, and calculate a reliability value based on the sample group, the replica, and the channel impulse response; and a timing estimation unit to estimate a preceding wave arrival timing and a delayed wave arrival timing based on the reliability value.

Advantageous Effects of Invention

The timing estimation device according to the present invention has an advantageous effect of being able to prevent degradation of the accuracy of estimating the timings of incoming waves even in an environment where there is a power difference between the incoming waves.

DESCRIPTION OF EMBODIMENTS

Hereinafter, a timing estimation device and a timing estimation method according to embodiments of the present invention will be described in detail with reference to the drawings. Note that the embodiments are not intended to limit the invention.

First Embodiment

Figure 1:
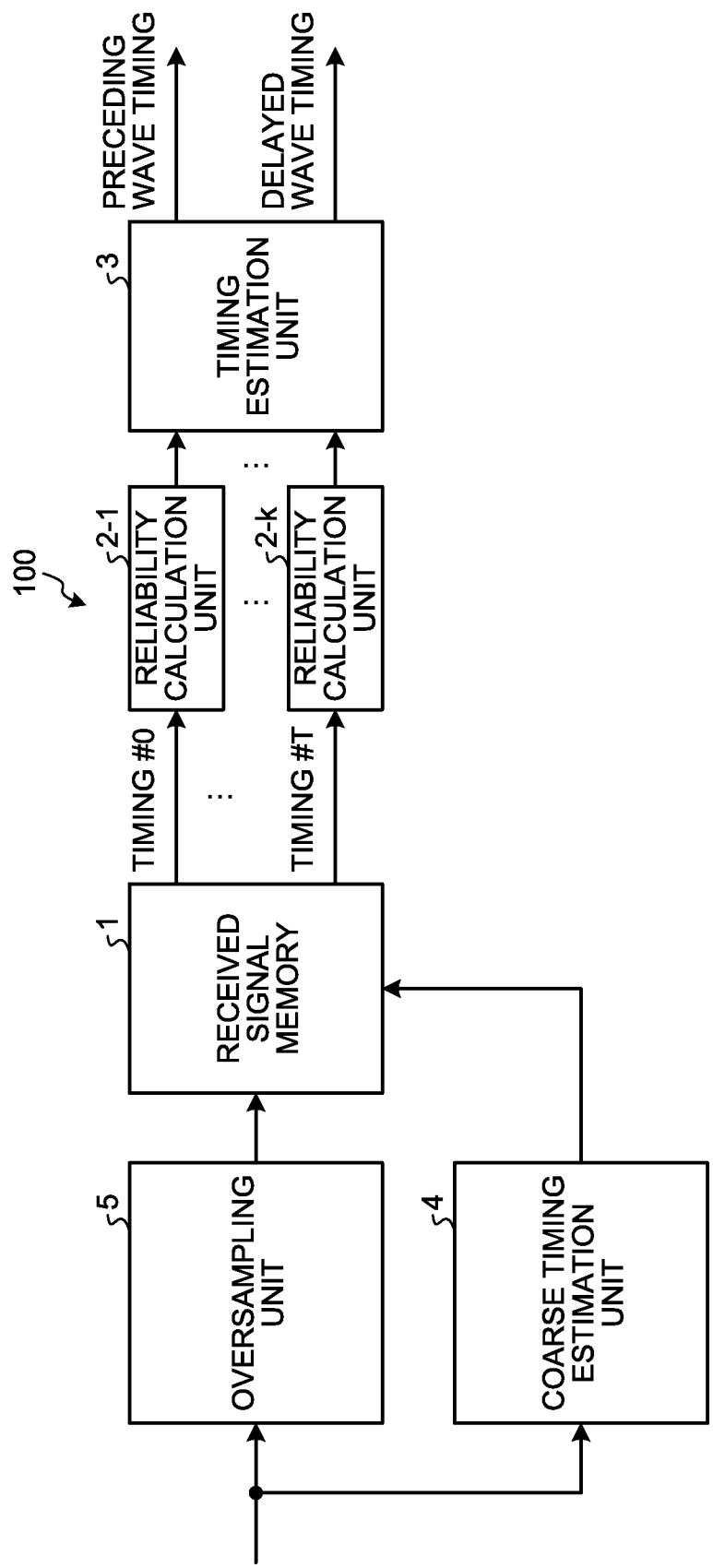
FIG. 1 is a diagram illustrating a configuration example of a timing estimation device according to a first embodiment.

FIG. 1 is a diagram illustrating a configuration example of a timing estimation device according to a first embodiment of the present invention. A timing estimation device 100 of the present embodiment is a device that estimates the positions of incoming waves, that is, the timings of the incoming waves, using a known sequence contained in a received signal. The timing estimation device 100 of the present embodiment is mounted on a receiving apparatus that receives a radio signal transmitted from a transmitting apparatus in a wireless communication system, for example. The timing estimation device 100 of the present embodiment may be mounted on an equalizer that performs time-domain equalization on a received signal. In addition, estimation results outputted from the timing estimation device 100 of the present embodiment may be used in an equalizer that performs time-domain equalization.

As illustrated in FIG. 1, the timing estimation device 100 of the present embodiment includes a received signal memory 1, reliability calculation units 2-1 to 2-$k$, a timing estimation unit 3, a coarse timing estimation unit 4, and an oversampling unit 5. k is an integer greater than or equal to two. The following describes an example where the timing estimation device 100 includes the oversampling unit 5, but the oversampling unit 5 may be provided outside the timing estimation device 100.

The oversampling unit 5 receives a received signal having been sampled at symbol rate intervals. A symbol is a unit of transmitted data, for example, a unit of one modulation when a signal is modulated and transmitted. Each symbol is transmitted at a regular time interval. Intervals at which symbols are transmitted by a transmitting apparatus are called symbol rate intervals. The oversampling unit 5 oversamples a received signal by N times on a frame-by-frame basis, and stores the oversampled received signal in the received signal memory 1. N is an integer greater than or equal to two. A frame is a unit of transmitted data. In this example, one frame is assumed to be composed of F symbols. F is an integer greater than or equal to two. The oversampling unit 5 converts F symbols for one frame into F×N samples. In addition, it is assumed that one frame contains a known sequence {X(0), . . . , X(L−1)} with a sequence length being L symbols (L is an integer greater than one and less than F).

In the received signal memory 1, an oversampled received signal for one frame is stored. The oversampled received signal stored in the received signal memory 1 is updated into an oversampled received signal for the next frame when processing in a subsequent stage for one frame, that is, processing in the timing estimation unit 3 is finished.

The received signal memory 1 outputs L−M+1 samples (L−M+1 is a first number) with symbol rate intervals of the stored oversampled received signal to the reliability calculation units 2-1 to 2-$k$. Specifically, the received signal memory 1 is a received signal output unit that outputs a plurality of sample groups each of which is L−M+1 samples extracted at symbol rate intervals from the oversampled received signal containing the known sequence, with shifting the leading positions of the sample groups by one sample each. M is a tap length in the estimation of Channel Impulse Response (hereinafter, referred to as CIR), which is a value set based on a possible most-delayed symbol number, and is an integer greater than one. The positions of the leading samples of the L−M+1 samples outputted to the reliability calculation units 2-1 to 2-$k$ are shifted by one sample each. That is, the positions or the timings of the received signal outputted to the reliability calculation units 2-1 to 2-$k$ are shifted by one sample each. Here, the sample outputted to the reliability calculation unit 2-1 is referred to as a timing #0 sample, the sample outputted to the reliability calculation unit 2-2 is referred to as a timing #1 sample, and the sample outputted to the reliability calculation unit 2-$k$ is referred to as a timing # T sample. Note that T=k−1. In the same manner, the samples outputted to the reliability calculation units 2-$i$ (i=0, 1, . . . , k) are referred to as timing # j (j=i−1) samples. Numerical values after # in the timings #0 to # T are numerical values representing the leading positions of the samples inputted to the reliability calculation units 2-1 to 2-$k$. In FIG. 1, the timing # j sample is abbreviated as a timing # j. The leading position of the timing #0 samples is determined by the coarse timing estimation unit 4 described later.

The reliability calculation units 2-1 to 2-$k$ each calculate a CIR for the corresponding one of the plurality of sample groups outputted from the received signal memory 1, based on the sample group, generate a replica of the received signal using the CIR and the known sequence, and calculate a reliability value based on the sample group, the replica, and the CIR. The reliability calculation units 2-1 to 2-$k$ may be configured to be one reliability calculation unit. The L−M+1 samples or a group of samples inputted to the reliability calculation units 2-1 to 2-$k$ are shifted from each other one-sample by one-sample as described above. Details of processing in the reliability calculation units 2-1 to 2-$k$ will be described later.

The timing estimation unit 3 estimates the timings of incoming waves based on the k reliability values calculated by the reliability calculation units 2-1 to 2-$k$. Here, it is assumed that the timing estimation unit 3 estimates a preceding wave arrival timing and a delayed wave arrival timing, that is, a preceding wave timing and a delayed wave timing as an example of the estimation of the timings of the incoming waves, and outputs the estimated preceding wave timing and delayed wave timing. Hereinafter, the reliability calculation units 2-1 to 2-$k$ are described as the reliability calculation units 2 when referring to them without distinction.

The coarse timing estimation unit 4 estimates a rough position of the known sequence in the received signal, based on the received signal, and from the estimated position, outputs information indicating the leading position of the timing #0 sample to the received signal memory 1. For a method of estimating the rough position of the known sequence in the coarse timing estimation unit 4, any method may be used. For example, a method of estimation based on a correlation value between the known sequence and the received signal may be used. Upon estimating the rough position of the known sequence, the coarse timing estimation unit 4 sets a position prior to the leading end of the estimated known sequence position as a leading position of the timing #0 sample. For example, when the coarse timing estimation unit 4 estimates that L symbols from the u-th symbol of the F symbols in one frame are a known sequence, it sets a position prior to the u-th symbol as a leading position of the timing #0 sample.

Figure 2:
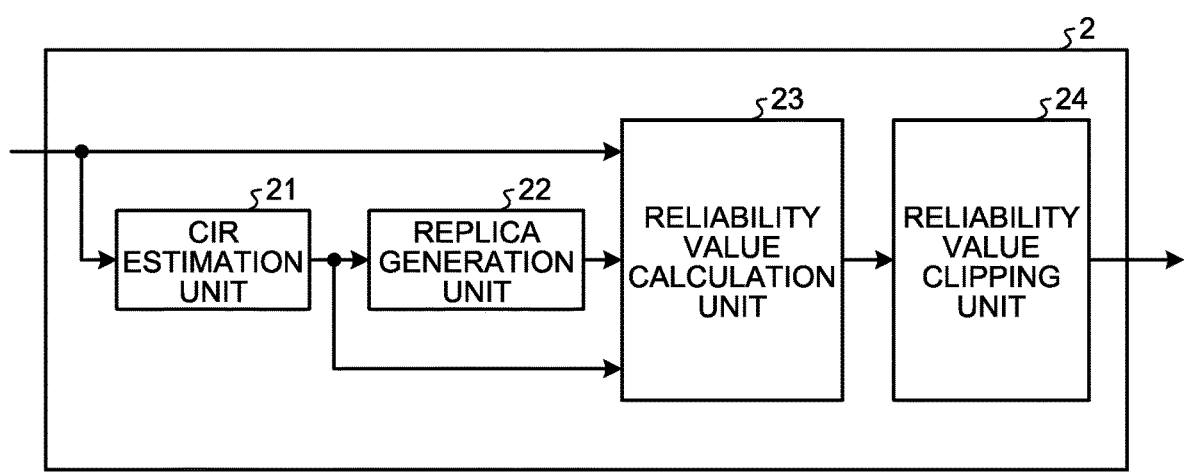
FIG. 2 is a diagram illustrating a configuration example of a reliability calculation unit in the first embodiment.

FIG. 2 is a diagram illustrating a configuration example of the reliability calculation unit 2 of the present embodiment. As illustrated in FIG. 2, each reliability calculation unit 2 includes a CIR estimation unit 21, a replica generation unit 22, a reliability value calculation unit 23, and a reliability value clipping unit 24.

Figure 3:
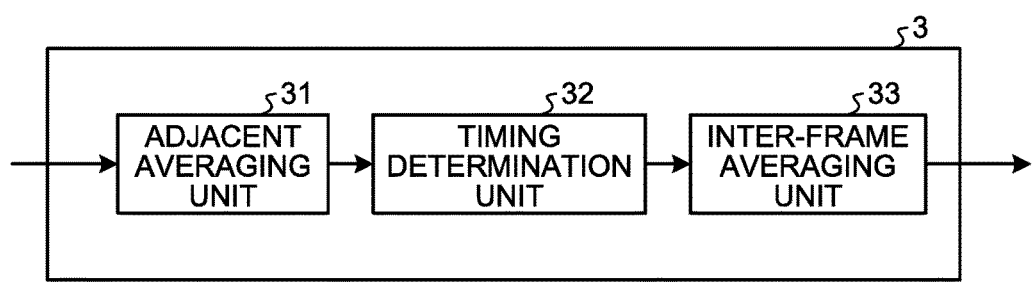
FIG. 3 is a diagram illustrating a configuration example of a timing estimation unit in the first embodiment.

FIG. 3 is a diagram illustrating a configuration example of the timing estimation unit 3 of the present embodiment. The timing estimation unit 3 includes an adjacent averaging unit 31, a timing determination unit 32, and an inter-frame averaging unit 33. The operations of components illustrated in FIGS. 2 and 3 will be described later.

Figure 4:
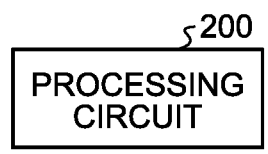
FIG. 4 is a diagram illustrating a configuration example of a processing circuit in the first embodiment.

Next, the hardware configuration of the timing estimation device 100 of the present embodiment will be described. Components constituting the timing estimation device 100 of the present embodiment are implemented by a processing circuit. FIG. 4 is a diagram illustrating a configuration example of the processing circuit. A processing circuit 200 illustrated in FIG. 4 is a processing circuit configured to be a dedicated circuit. Examples of the processing circuit 200 include an Application Specific Integrated Circuit (ASIC), a Field Programmable Gate Array (FPGA), and any combination of them.

Figure 5:
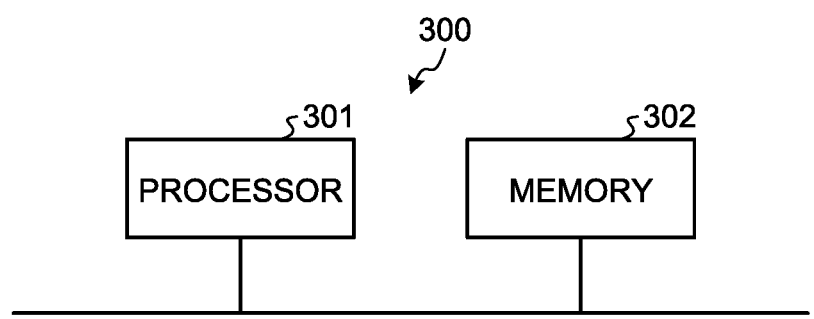
FIG. 5 is a diagram illustrating a configuration example of a processing circuit in the first embodiment.

The processing circuit implementing the components constituting the timing estimation device 100 of the present embodiment may be a processing circuit including a processor. FIG. 5 is a diagram illustrating a configuration example of the processing circuit including the processor. A processing circuit 300 illustrated in FIG. 5 includes a processor 301 and a memory 302. The processor 301 corresponds to a central processing unit (CPU), a microprocessor, or the like. The memory 302 corresponds to a nonvolatile or volatile semiconductor memory such as Random Access Memory (RAM), Read Only Memory (ROM), or a flash memory, or a magnetic disk or the like.

When the processing circuit for implementing the components constituting the timing estimation device 100 of the present embodiment is implemented by the processing circuit 300 illustrated in FIG. 5, the functions of the components constituting the timing estimation device 100 are implemented by the processor 301 executing programs stored in the memory 302. The memory 302 is also used as a storage area when the processor 301 executes the programs. Some of the components constituting the timing estimation device 100 of the present embodiment may be implemented by the processing circuit 200 configured to be a dedicated circuit, and the remainder may be implemented by the processing circuit 300 including the processor 301.

Figure 6:
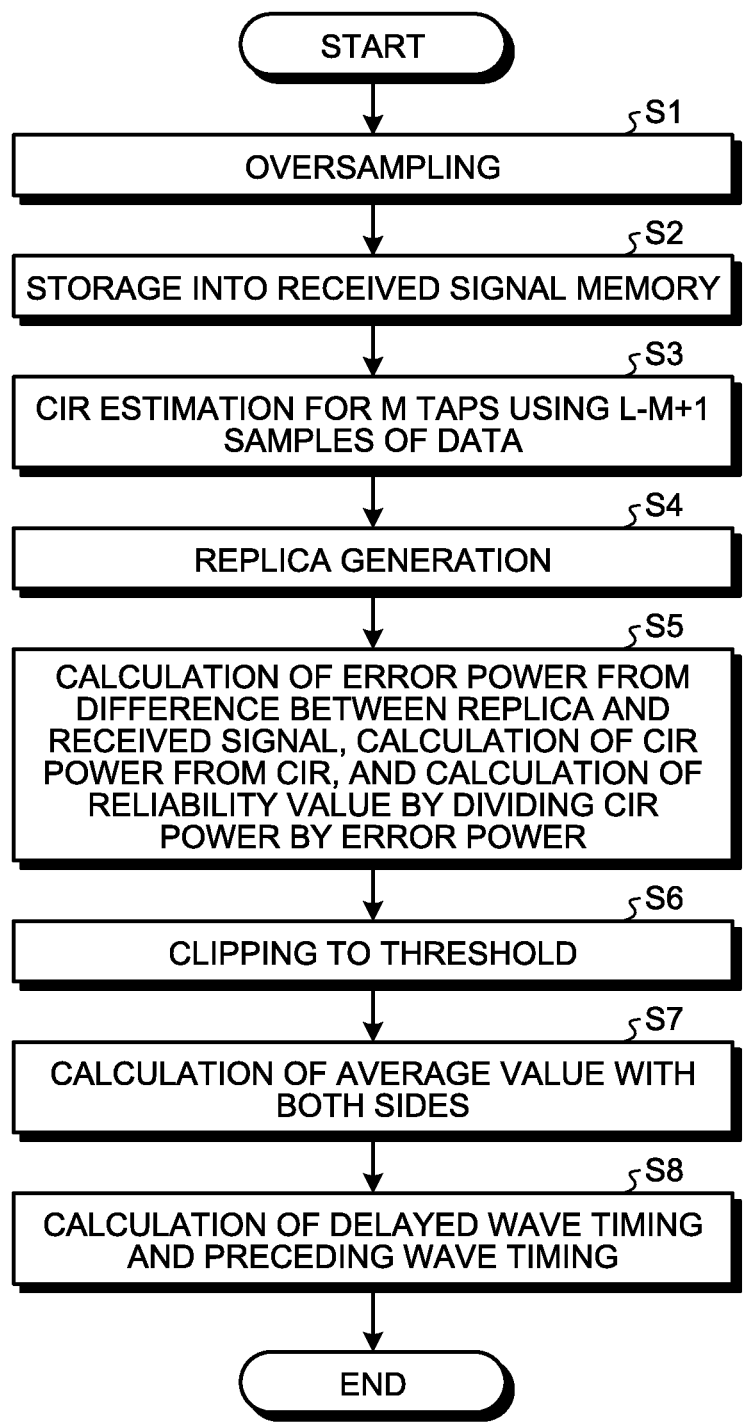
FIG. 6 is a flowchart illustrating an example of a timing estimation method in the timing estimation device of the first embodiment.

Next, a timing estimation method of the present embodiment will be described. FIG. 6 is a flowchart illustrating an example of a timing estimation method in the timing estimation device 100 of the present embodiment. The timing estimation method of the present embodiment will be described with reference to FIGS. 1, 2, 3, and 6. It is noted that before the start of an operation illustrated in FIG. 6, the coarse timing estimation unit 4 gives an instruction to the received signal memory 1 about the leading position of the timing #0 sample.

First, the oversampling unit 5 of the timing estimation device 100 oversamples a received signal (step S1), and stores the oversampled received signal in the received signal memory 1 (step S2). In the received signal memory 1, one frame of the oversampled received signal, that is, F×N samples of $\{r(1), \ldots, r(F \times N)\}$ are stored. The received signal memory 1 outputs, to the reliability calculation unit 2-1, L−M+1 samples having a leading position of the timing #0 sample as a leading end, extracted at the symbol rate intervals, from among $\{r(1), \ldots, r(F \times N)\}$.

Figure 7:
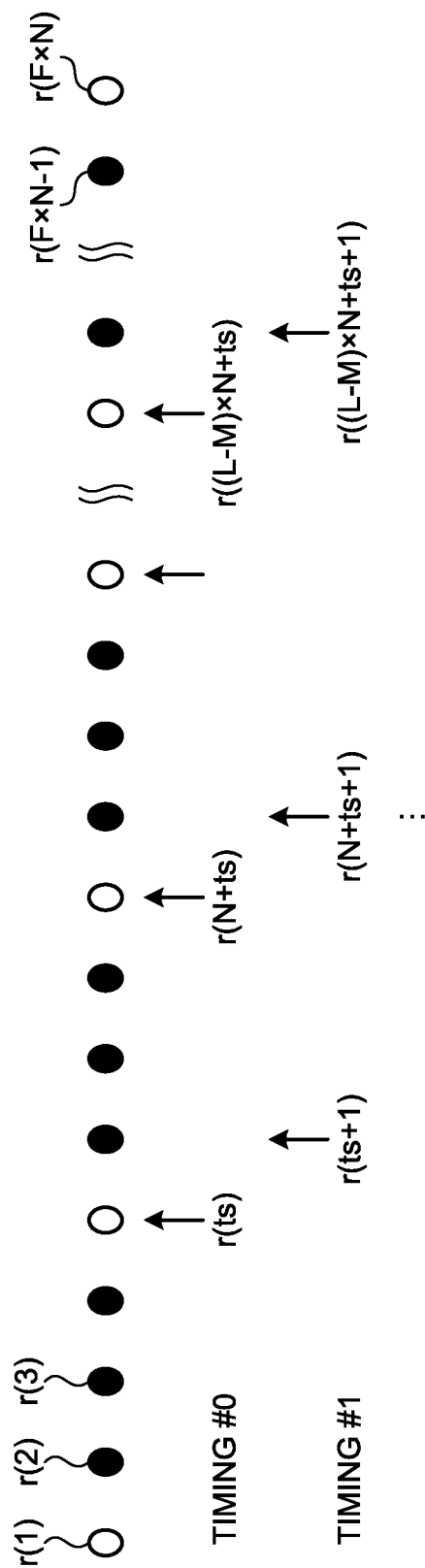
FIG. 7 is a diagram illustrating an example of samples outputted to the reliability calculation units in the first embodiment.

FIG. 7 is a diagram illustrating an example of the samples outputted to the reliability calculation units 2. White ovals illustrated in FIG. 7 indicate samples corresponding to symbols, that is, points of the received signal before oversampling, and black ovals indicate samples added by oversampling. If the leading position of the timing #0 samples is the $t_s$-th sample, $\{r(t_s), r(N+t_s), \ldots, r((L-M) \times N+t_s)\}$ are outputted as the timing #0 samples to the reliability calculation unit 2-1. To the reliability calculation unit 2-2, $\{r(t_s+1), \ldots, r((L-M) \times N+t_s+1)\}$ are outputted as timing #1 samples. Thus, L−M+1 samples each shifted by one sample are outputted from the received signal memory 1 to the reliability calculation units 2. When generalized, timing # t (t=0, 1, T) samples are $\{r(t_s+t), r(t_s+t+N), \ldots, r((L-M) \times N+t_s+t)\}$.

The description returns to the explanation of FIG. 6. The CIR estimation unit 21 of each reliability calculation unit 2 estimates the CIR for M taps, using the L−M+1 samples, that is, the L−M+1 symbols of data, extracted at the symbol rate intervals (step S3). In other words, the CIR estimation unit 21 that is a first estimation unit calculates the CIR for a second number of taps, that is, the M taps from the sample group of the L−M+1 samples extracted at the symbol rate intervals. The CIR estimation unit 21 outputs the estimated CIR to the replica generation unit 22 and the reliability value calculation unit 23. As a CIR estimation method in the CIR estimation unit 21, the following method may be used. Timing # t samples inputted to the reliability calculation unit 2 are expressed by a vector $\mathbf{r}_t$ that is a row vector with L−M+1 columns, in which an element in the y-th column is $r((y-1) \times N+t_s+t)$, and a matrix generated from the known sequence is a matrix $\mathbf{X}$. The matrix $\mathbf{X}$ is a matrix with M rows and L−M+1 columns, whose element in x row and y column is X(M−x+y−1). x and y are integers indicating a row and a column, respectively. At this time, the CIR can be determined by multiplying the vector $\mathbf{r}_t$ by a pseudo inverse matrix of the matrix $\mathbf{X}$. This is expressed by the following formula (1). Here, $\mathbf{C}_t$ is a row vector with M columns, and is an estimate of the CIR at a timing # t. Hereinafter, an element in the y-th column of $\mathbf{C}_t$ is represented as $C_t(y-1)$. In formula (1), a superscript "H" of the matrix indicates complex transposition, and a superscript "−1" of the matrix represents an operator inverting the matrix. The CIR estimation method is not limited to this example.

[Formula 1]

$$c_t = r_t x^H (x \cdot x^H)^{-1} \quad (1)$$

Next, the replica generation unit 22 generates a replica of the received signal using the CIR (step S4). The replica generation unit 22 is a first replica generation unit that generates a first replica using the CIR of the M taps and the known sequence. Specifically, the replica generation unit 22 performs convolution of the known sequence {X(0), . . . , X(L−1)} and the CIR {$C_t(0)$, . . . , $C_t(M−1)$}, and determines a replica from the result of the convolution. For example, the replica generation unit 22 can determine the replica x-th element $rep_t(x)$ at the timing # t by the following formula (2).

[Formula 2]

$$rep_t(x) = \Sigma_{k=0}^{M-1} C_t(k) \cdot X(x+M-2-k) \quad (2)$$

By generating the above-described $rep_t(x)$ from x=1 to x=L−M+1, a replica with a length of L−M+1 inputted to the reliability calculation unit 2, that is, a length of L−M+1 at the symbol rate intervals can be generated. The replica generation unit 22 outputs the replica thus generated to the reliability value calculation unit 23.

The reliability value calculation unit 23 calculates an error power from a difference between the replica and the received signal, calculates a CIR power from the CIR, and divides the CIR power by the error power to calculate a reliability value (step S5). That is, the reliability value calculation unit 23 is a first calculation unit that calculates an error power based on a sample group and a replica, calculates the power of a CIR based on the CIR for M taps, and calculates a first reliability value that is a reliability value based on the error power and the power of the CIR. Specifically, the reliability value calculation unit 23 calculates a difference for each element between a replica outputted from the replica generation unit 22 and an oversampled received signal outputted from the received signal memory 1. Since each of the oversampled received signal outputted from the received signal memory 1 and the replica outputted from the replica generation unit 22 is composed of L−M+1 elements, the number of the above-described calculated differences is L−M+1. The reliability value calculation unit 23 determines a sum of squares of the calculated L−M+1 differences, and sets it as an error power. The reliability value calculation unit 23 calculates a sum of squares of the taps of an input CIR, that is, a sum of squares for the M taps, and sets it as a CIR power. Then, the reliability value calculation unit 23 outputs a result obtained by dividing the CIR power by the error power as a reliability value to the reliability value clipping unit 24.

The reliability value clipping unit 24 clips the reliability value to a clipping threshold that is a threshold (step S6). Specifically, when the reliability value outputted from the reliability value calculation unit 23 exceeds a preset clipping threshold, the reliability value clipping unit 24 outputs the reliability value clipped to the clipping threshold to the timing estimation unit 3. That is, the reliability value clipping unit 24 performs clipping processing to output the clipping threshold to the timing estimation unit 3 when the reliability value exceeds the clipping threshold. Here, an example where the timing estimation device 100 includes the reliability value clipping unit 24 is described. However, the timing estimation device 100 may not include the reliability value clipping unit 24. When the timing estimation device 100 does not include the reliability value clipping unit 24, the reliability value outputted from the reliability value calculation unit 23 is directly outputted to the timing estimation unit 3.

The adjacent averaging unit 31 of the timing estimation unit 3 calculates an average value of a reliability value outputted from each reliability calculation unit 2 with those at two adjacent timings (step S7). Specifically, the adjacent averaging unit 31 averages a reliability value and reliability values corresponding to an adjacent sample group that is a group of samples each shifted by one sample from the sample group corresponding to the reliability value. For example, when a reliability value at a timing # a is α, the adjacent averaging unit 31 uses a reliability value β at a timing # a−1 and a reliability value γ at a timing # a+1 to calculate an average value with those at the two adjacent timings by (α+β+γ)/3. Timings at the ends, that is, the timing #0 and the timing # T have only one adjacent timing. In this case, the adjacent averaging unit 31 calculates an average value of one at a timing at an end and another at a timing adjacent to that timing. For example, when the reliability value at the timing #0 is α, the adjacent averaging unit 31 uses a reliability value β at the timing #1 to calculate (α+β)/2 as an average value. The adjacent averaging unit 31 calculates k average values using reliability values corresponding to k timings, that is, the timings #0 to # T, outputted from the k reliability calculation units 2, and outputs the calculated k average values to the timing estimation unit 3.

In the above example, as a method of calculating an adjacent average, an example of calculating an average value with those on two neighbors is provided. Alternatively, an average with one at one adjacent timing may be calculated as an adjacent average. The method of calculating an adjacent average is not limited to the above-described example. Without providing the adjacent averaging unit 31, reliability values outputted from the reliability calculation units 2 may be directly outputted to the timing determination unit 32.

The timing determination unit 32 calculates a delayed wave timing and a preceding wave timing (step S8), outputs the calculated delayed wave timing and preceding wave timing to the inter-frame averaging unit 33, and finishes processing for one frame. Specifically, the timing determination unit 32 searches for the largest one of the reliability values on the k timings. The timing determination unit 32 sets, as a threshold, a value obtained by multiplying the reliability value obtained by the search, that is, the largest value of the reliability values by a preset constant. This constant is a positive real number equal to or less than one. The timing determination unit 32 compares the reliability value at each timing with the threshold to determine a timing at which the reliability value is greater than or equal to the threshold. Here, the numerical values after # in the timings #0 to # T are referred to as timing numbers. From among the timings at which the reliability values are greater than or equal to the threshold, the timing determination unit 32 sets the timing with the smallest timing number as a delayed wave timing, and sets the timing with the largest timing number as a preceding wave timing, and outputs them. At this time, the delayed wave timing outputted from the timing determination unit 32 is a timing of a delayed wave corresponding to the most-delayed wave of delayed waves. The timing determination unit 32 outputs, as the delayed wave timing and the preceding wave timing, their respective timing numbers, for example.

The inter-frame averaging unit 33 performs inter-frame averaging processing for preceding wave timings and delayed wave timings inputted from the timing determination unit 32 on a frame-by-frame basis, based on the processing illustrated in FIG. 6. The inter-frame averaging unit 33 outputs the preceding wave timing and delayed wave timing obtained after the averaging processing to the outside of the timing estimation device 100. That is, the timing estimation unit 3 estimates the preceding wave arrival timing and the delayed wave arrival timing for each frame, and outputs the average values of the preceding wave arrival timings and the delayed wave arrival timings for two or more frames, as estimation results.

The inter-frame averaging unit 33 may be configured to perform any processing as the averaging processing, but for example, it certainly performs the following processing. First, the inter-frame averaging unit 33 generates histograms or frequency distributions of preceding wave timings and delayed wave timings for each frame. The histograms of preceding wave timings and delayed wave timings are sequentially updated each time a preceding wave timing and a delayed wave timing are newly inputted. When the number of times a preceding wave timing and a delayed wave timing are inputted, that is, the number of processed frames exceeds a preset number of times of averaging, the inter-frame averaging unit 33 deletes them from the histograms in chronological order. The inter-frame averaging unit 33 extracts timing numbers at which a frequency in each histogram exceeds a preset threshold. Then, the inter-frame averaging unit 33 selects one timing from among the extracted timing numbers as a timing obtained after the averaging processing, in accordance with a predetermined rule. For the predetermined rule, for example, use may be made of a rule of selecting the smallest number from among the extracted timing numbers, a rule of selecting the largest number from among the extracted timing numbers, or a rule of selecting a timing number at which the frequency is greatest among the extracted timing numbers. The averaging method is not limited to the above-described methods.

The delayed wave spread, that is, the length between the delayed wave timing and the preceding wave timing can be calculated based on the timing number corresponding to the delayed wave timing outputted from the timing estimation device 100 and the timing number corresponding to the preceding wave timing, and the sample interval after oversampling. Note that, as described later, the delayed wave timing in the present embodiment means a timing when a delayed wave is detected at a timing corresponding to the longest delay that is a delay for the M taps. Thus, the timing at which a delayed wave has actually arrived is a timing obtained by delaying a delayed wave timing outputted from the timing estimation device 100 by M−1 taps. The timing estimation device 100 may output this timing obtained by the delay by M−1 taps as the delayed wave timing.

Figure 8:
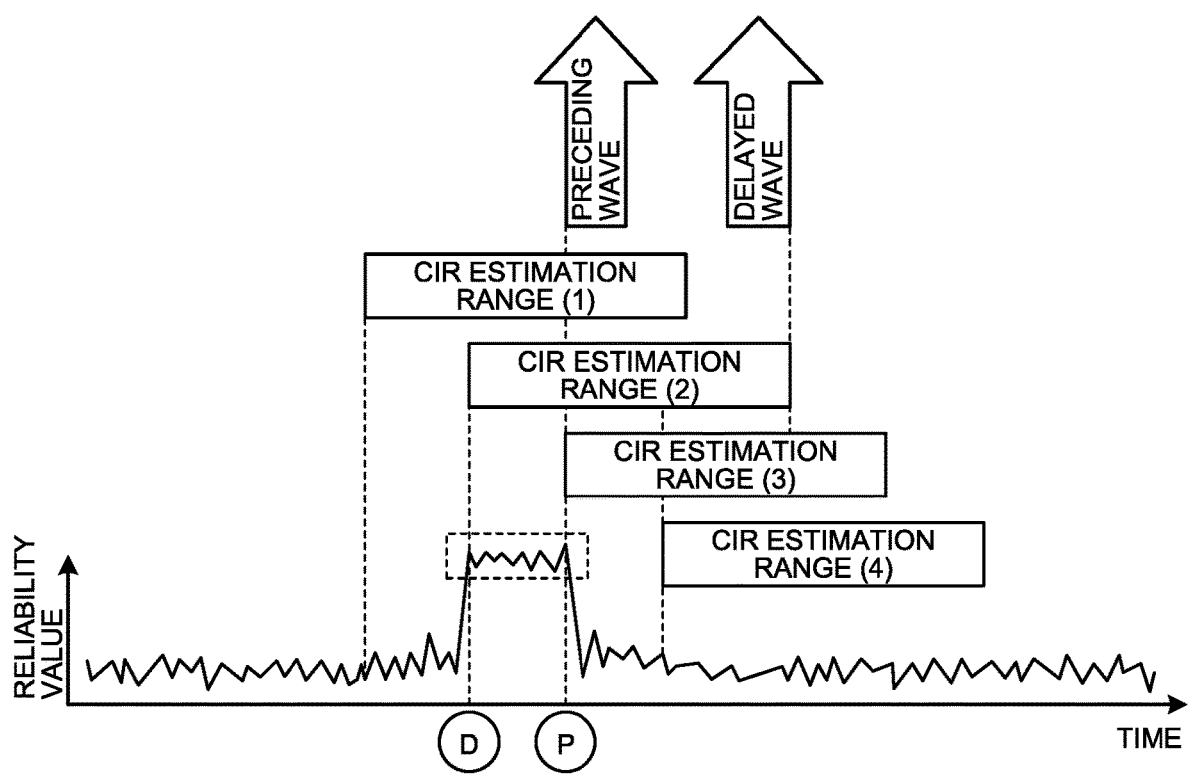
FIG. 8 is a diagram for explaining the effects of the first embodiment.

Next, effects obtained by the above-described timing estimation method will be described. FIG. 8 is a diagram for explaining the effects of the present embodiment. In FIG. 8, the horizontal axis indicates time, and the vertical axis indicates a reliability value. The reliability value, which is calculated for each timing as described above, is calculated at sample intervals for the oversample. FIG. 8 illustrates the calculated reliability values connected by straight lines. CIR estimation ranges (1) to (4) illustrated in FIG. 8 mean ranges in which the reliability value calculation units 23 of the reliability calculation units 2 corresponding to their respective different timings calculate reliability values. Since the reliability value calculation units 23 calculate the CIR for the M taps, the length of the CIR estimation ranges (1) to (4) is a value obtained by multiplying a symbol rate interval by M. The CIR estimation ranges (1) to (4) do not correspond to timings with continuous timing numbers described above. For example, the distance between a leading end of the CIR estimation range (1) and a leading end of the CIR estimation range (2) is a one-sample interval or more after oversampling.

An arrow with the words "preceding wave" in an upper part of FIG. 8 indicates the timing at which the leading end of the known sequence is received as a preceding wave, and an arrow with the words "delayed wave" in an upper part of FIG. 8 indicates the timing at which the leading end of the known sequence is received as a delayed wave. The width of each arrow indicates one symbol rate interval. In the example illustrated in FIG. 8, the CIR estimation range (1) covers the preceding wave but does not cover the delayed wave. The CIR estimation range (2) and the CIR estimation range (3) cover both the preceding wave and the delayed wave. The CIR estimation range (4) covers the delayed wave but does not cover the preceding wave.

As illustrated in FIG. 8, when an estimation range of CIR in the reliability calculation unit 2 is the CIR estimation range (1), any components of the delayed wave are not contained in a replica generated by the reliability calculation unit 2. Consequently, when the reliability calculation unit 2 calculates an error power, the components of the delayed wave contained in the received signal appear as differences between the replica and the received signal, thereby increasing the error power. Thus, when the CIR estimation range in the reliability calculation unit 2 is the CIR estimation range (1), the reliability value is small. When the CIR estimation range in the reliability calculation unit 2 is the CIR estimation range (4), a replica generated by the reliability calculation unit 2 does not contain any components of the preceding wave. Consequently, when the reliability calculation unit 2 calculates an error power, the components of the preceding wave contained in the received signal appear as differences between the replica and the received signal, thereby increasing the error power. Thus, when the CIR estimation range in the reliability calculation unit 2 is the CIR estimation range (4), the reliability value is small.

On the other hand, when the CIR estimation range in the reliability calculation unit 2 is the CIR estimation range (2) or the CIR estimation range (3), a replica generated by the reliability calculation unit 2 contains the components of the preceding wave and the delayed wave. Consequently, when the reliability calculation unit 2 calculates an error power, the error power is small, and the reliability value is large.

The above shows that the timing with the smallest timing number, that is, corresponding to the earliest time among timings at which the reliability values exceed the threshold is a timing at which the delayed wave is contained in the tail end of the CIR estimation range. The above also shows that the timing with the largest timing number, that is, corresponding to the latest time among timings at which the reliability values exceed the threshold is a timing at which the preceding wave is contained in the leading end of the CIR estimation range. At timings corresponding to a period from the CIR estimation range (2) to the CIR estimation range (3), the reliability values are continuously high as illustrated in FIG. 8. In FIG. 8, the letter "P" circled in a lower part indicates a start timing of the CIR estimation range containing the preceding wave in the leading end of the CIR estimation range, that is, the preceding wave timing, and the letter "D" circled in a lower part indicates a start timing of the CIR estimation range containing the delayed wave in the tail end of the CIR estimation range, that is, the delayed wave timing. If the reliability value momentarily becomes high due to some error factor, it is unlikely that the reliability value continuously becomes high. Thus, by averaging with adjacent timings by the adjacent averaging unit 31, the probability of false detection of the preceding wave and the delayed wave can be reduced.

In a certain environment where the carrier to noise ratio is high, the reliability value may become large as between the CIR estimation range (2) and the CIR estimation range (3). In such a case, there is a possibility that the threshold used in the timing determination unit 32, that is, the threshold generated from the largest value of the reliability values becomes too large to detect the timings of the preceding wave and the delayed wave. For this reason, the reliability value clipping unit 24 clips the reliability value to a predetermined clipping threshold, thereby preventing a threshold generated in the timing determination unit 32 from being too large, so that the probability of non-detection of the timings of the preceding wave and the delayed wave can be reduced.

In a comparative example where a timing is estimated based on the correlation value between a received signal and a known sequence, when there is a power difference between incoming waves, a data sequence that is a portion other than the known sequence may be similar to the known sequence. When the correlation value of a portion where the data sequence and the known sequence are similar is the same level as or greater than the correlation value at a timing corresponding to an incoming wave with lower power among incoming waves between which there is a power difference, false detection of the incoming wave timings occurs. In order to solve this problem, it is necessary to increase the length of the known sequence, to increase the number of times of averaging, or to take both measures to do so. However, if any of these measures are taken, data transmission efficiency is reduced. In contrast, the timing estimation device 100 of the first embodiment described above can increase an error between a generated replica and a received signal to reduce the reliability value even at a timing at which, in the comparative example, the correlation value becomes high due to similarity between a data sequence and a known sequence. Thus, even when there is a power difference between incoming waves, the occurrence of false detection of incoming wave timings can be reduced compared to the comparative example. Consequently, even when there is a power difference between incoming waves, the first embodiment can accurately estimate the timings of a preceding wave and a delayed wave in a short time with a short known sequence.

Second Embodiment

Figure 9:
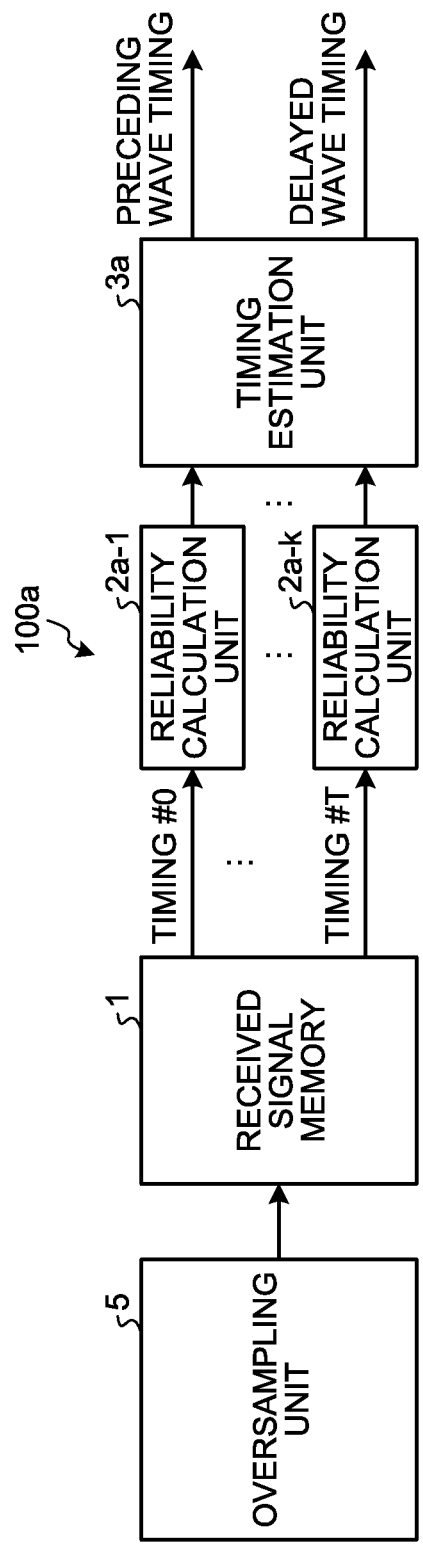
FIG. 9 is a diagram illustrating a configuration example of a timing estimation device in a second embodiment.

FIG. 9 is a diagram illustrating a configuration example of a timing estimation device according to a second embodiment of the present invention. A timing estimation device 100a of the second embodiment does not include the coarse timing estimation unit 4 of the first embodiment, but includes reliability calculation units 2a-1 to 2a-k and a timing estimation unit 3a in place of the reliability calculation units 2-1 to 2-k and the timing estimation unit 3 of the first embodiment. Hereinafter, the reliability calculation units 2a-1 to 2a-k are described as reliability calculation units 2a when indicated without distinction. The same reference symbols as those in the first embodiment are assigned to components having the same functions as those of the first embodiment to omit redundant explanations. Hereinafter, differences from the first embodiment will be mainly described.

Figure 10:
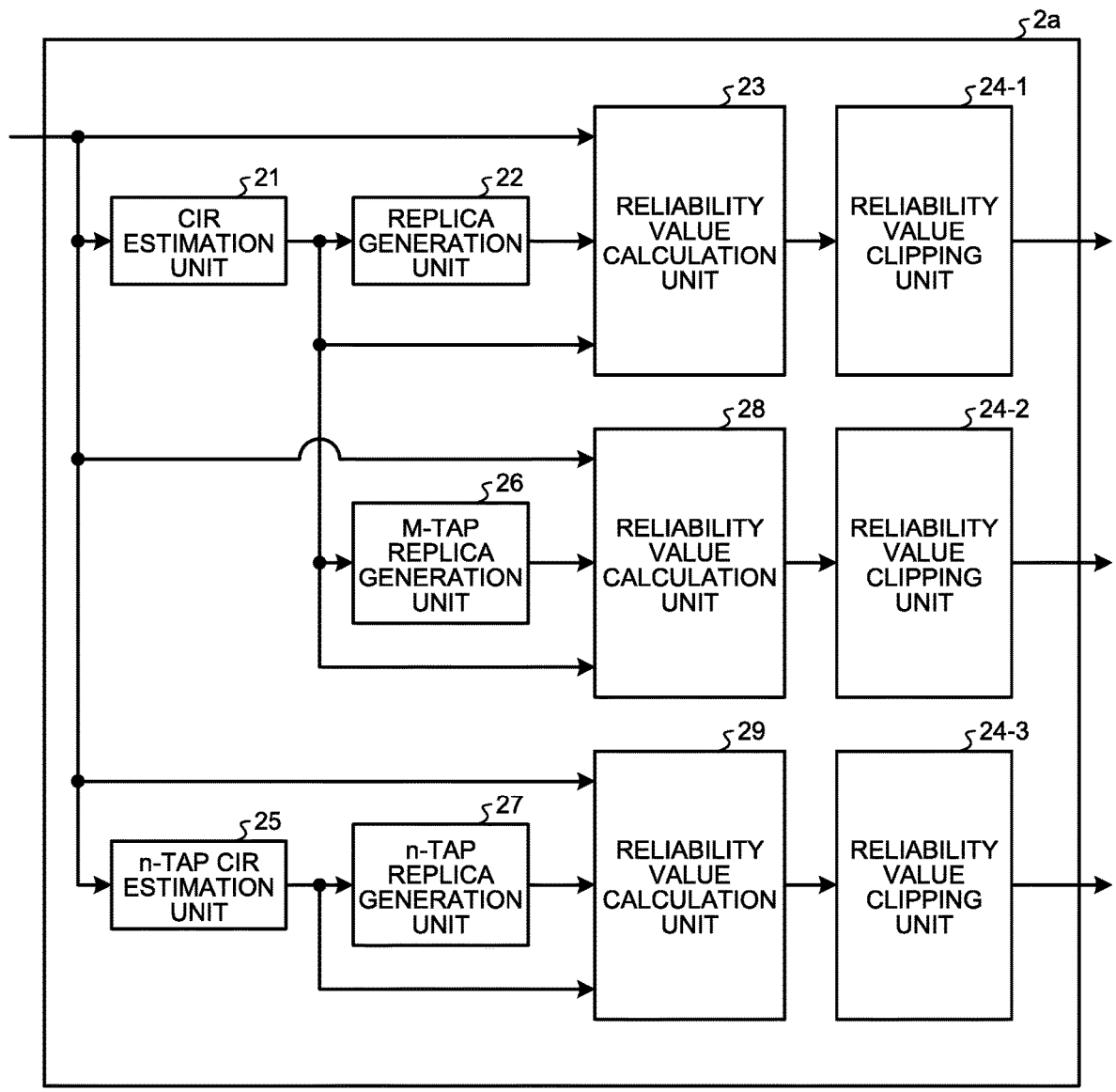
FIG. 10 is a diagram illustrating a configuration example of a reliability calculation unit in the second embodiment.

FIG. 10 is a diagram illustrating a configuration example of each reliability calculation unit 2a of the present embodiment. The reliability calculation unit 2a includes the CIR estimation unit 21, the replica generation unit 22, the reliability value calculation unit 23, and a reliability value clipping unit 24-1 as with the first embodiment. Although the reliability value clipping unit 24-1 has a branch number attached to the reference numeral, it has the same function as the reliability value clipping unit 24 of the first embodiment. The reliability calculation unit 2a further includes an n-tap CIR estimation unit 25, an M-tap replica generation unit 26, an n-tap replica generation unit 27, reliability value calculation units 28 and 29, and reliability value clipping units 24-2 to 24-3.

Figure 11:
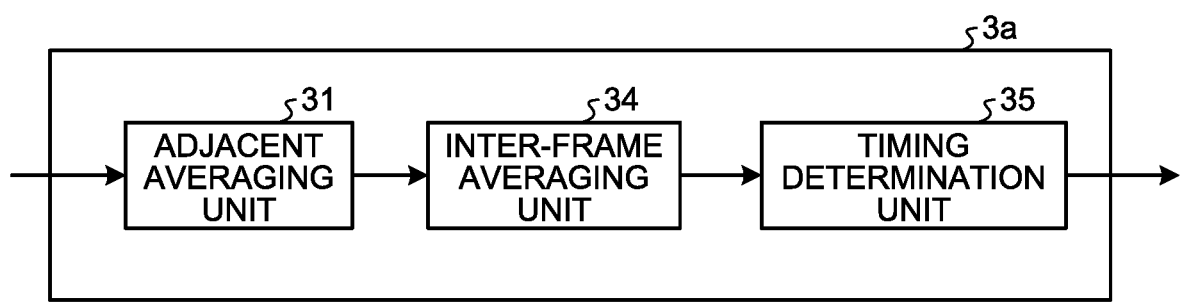
FIG. 11 is a diagram illustrating a configuration example of a timing estimation unit in the second embodiment.

FIG. 11 is a diagram illustrating a configuration example of the timing estimation unit 3a of the present embodiment. The timing estimation unit 3a includes the adjacent averaging unit 31, an inter-frame averaging unit 34, and a timing determination unit 35.

The components constituting the timing estimation device 100a of the present embodiment are implemented by a processing circuit. As described in the first embodiment, the processing circuit may be the processing circuit 200 that is a dedicated circuit, or may be the processing circuit 300 including the processor 301, or may include both the processing circuit 200 and the processing circuit 300.

Next, the operation of the present embodiment will be described. Each reliability calculation unit 2a of the present embodiment calculates a reliability value like that in the first embodiment by the CIR estimation unit 21, the replica generation unit 22, the reliability value calculation unit 23, and the reliability value clipping unit 24-1. A replica generated by the replica generation unit 22 is also referred to as a first replica. A reliability value generated by the reliability value calculation unit 23 is also referred to as a first reliability value. However, in the present embodiment, since the timing estimation device 100a does not include the coarse timing estimation unit 4, oversampled samples are outputted from the received signal memory 1 to the reliability calculation units 2a with $t_s$ in the first embodiment being set as zero.

Each reliability calculation unit 2a of the present embodiment further performs the operation described below. The M-tap replica generation unit 26 generates a second replica that is a replica of a received signal, using the results of convolution of the CIR for n (n is an integer smaller than M) taps from the tail end of the CIR for the M taps generated by the CIR estimation unit 21 and the known sequence. That is, the M-tap replica generation unit 26 is a second replica generation unit that generates a second replica using CIR corresponding to the n taps that is a third number of taps at the end of the M taps, of the CIR for the M taps. For a replica generation method in the M-tap replica generation unit 26, the same method as that of the first embodiment may be used.

The reliability value calculation unit 28 calculates an error power between the second replica and the received signal, calculates the CIR power for the n taps from the tail end of the CIR for the M taps generated by the CIR estimation unit 21, divides the CIR power by the error power, and outputs the result of the division to the reliability value clipping unit 24-2 as a second reliability value. In other words, the reliability value calculation unit 28 is a second calculation unit that calculates an error power based on a sample group and a second replica, calculates a CIR power that is the power of CIR corresponding to the n taps at the tail end of the M taps based on the CIR corresponding to the n taps at the tail end of the M taps, and calculates a second reliability value based on the calculated error power and CIR power. For a method of calculating error power and CIR power in the reliability value calculation unit 28, the same method as the error power calculation method in the reliability value calculation unit 23 may be used.

The reliability value clipping unit 24-2 clips the reliability value outputted from the reliability value calculation unit 28 to a predetermined clipping threshold, and outputs it to the timing estimation unit 3a. The clipping threshold in the reliability value clipping unit 24-2 may be the same as or different from the clipping threshold in the reliability value clipping unit 24-1.

The n-tap CIR estimation unit 25 that is a second estimation unit determines the CIR for n taps based on the oversampled received signal outputted from the received signal memory 1, and outputs the determined CIR to the n-tap replica generation unit 27 and the reliability value calculation unit 29. A method of calculating the CIR for the n taps may be a method using n instead of M in the CIR described in the first embodiment, or may be a method different from the method described in the first embodiment.

The n-tap replica generation unit 27 that is a third replica generation unit performs the convolution of the CIR outputted from the n-tap CIR estimation unit 25 and the known sequence, and on the basis of the results of the convolution, generates a third replica that is a replica of the received signal, and outputs the third replica to the reliability value calculation unit 29. For a replica generation method in the n-tap replica generation unit 27, the same method as that of the first embodiment may be used.

The reliability value calculation unit 29 calculates an error power between the third replica and the oversampled received signal, determines the CIR power of the CIR for the n taps outputted from the n-tap CIR estimation unit 25, divides the CIR power by the error power, and outputs the result of the division to the reliability value clipping unit 24-3 as a third reliability value. The reliability value calculation unit 29 is a third calculation unit that calculates an error power based on a sample group and a third replica, calculates a CIR power based on the CIR for a third number of taps, that is, the n taps, and calculates a third reliability value based on the calculated error power and CIR power. For a method of calculating error power and CIR power in the reliability value calculation unit 29, the same method as the error power calculation method in the reliability value calculation unit 23 may be used.

The reliability value clipping unit 24-3 clips the reliability value outputted from the reliability value calculation unit 29 to a predetermined clipping threshold, and outputs it to the timing estimation unit 3a. The clipping threshold in the reliability value clipping unit 24-3 may be the same as or different from the clipping threshold in the reliability value clipping unit 24-1.

The timing estimation device 100a may be configured not to include the reliability value clipping units 24-1 to 24-3. When the reliability value clipping units 24-1 to 24-3 are not provided, the first reliability value, the second reliability value, and the third reliability value outputted from the reliability value calculation units 23, 28, and 29 are directly outputted to the timing estimation unit 3a.

Next, in the timing estimation unit 3a, the adjacent averaging unit 31 performs adjacent averaging processing on the first reliability values, the second reliability values, and the third reliability values after clipping outputted from the reliability calculation units 2a as in the first embodiment, and outputs the processing results to the inter-frame averaging unit 34. In the present embodiment, the processing so far is performed on a frame-by-frame basis. Therefore, the flow of the processing performed for each frame in the second embodiment is obtained by deleting step S8 in the flowchart illustrated in FIG. 6 described in the first embodiment. In addition to execution of steps S3 to S5 in the flowchart illustrated in FIG. 6, the above-described processing in the n-tap CIR estimation unit 25, the M-tap replica generation unit 26, the n-tap replica generation unit 27, the reliability value calculation units 28 and 29, and the reliability value clipping units 24-2 to 24-3 is executed, and in step S7, the adjacent averaging processing on the first reliability values, the second reliability values, and the third reliability values is executed.

The inter-frame averaging unit 34 calculates inter-frame average values on the first reliability values, the second reliability values, and the third reliability values, respectively. That is, the inter-frame averaging unit 34 calculates average values of the first reliability values, the second reliability values, and the third reliability values, respectively, at different timings inputted on a frame-by-frame basis. As a method of calculating an average value, a method of taking a moving average may be used. For example, when the average of first reliability values up to the (q−1)-th frame is regarded as $\alpha$, and a first reliability value for q frames is regarded as $\beta$, the inter-frame averaging unit 34 can determine an average value for the q frames by $\alpha \times (1-a) + \beta \times a$. q is an integer indicating a frame number. a is a positive real number of one or less, and the inverse of a means the number of times of averaging. The average values of the second reliability values and the third reliability values can be calculated by the same method. A method of calculating the average value of the reliability values is not limited to this method, and may be any method, for example, may be interval averaging.

The inter-frame averaging unit 34 outputs, to the timing determination unit 35, the calculated average values of the first reliability values, the second reliability values, and the third reliability values. Hereinafter, in the description of the processing of the inter-frame averaging unit 34, the average values of the first reliability values, the second reliability values, and the third reliability values are referred to as first reliability values, second reliability values, and third reliability values, respectively. Using the first reliability values, the timing determination unit 35 sets a threshold based on the largest value, and determines timings at which the threshold is exceeded as in the timing determination unit 32 of the first embodiment. Then, the timing determination unit 35 sets, as a delayed wave timing, a timing at which the second reliability value is the largest among the determined timings. The timing determination unit 35 sets, as a preceding wave timing, a timing at which the third reliability value is the largest among the determined timings. The timing determination unit 35 outputs the determined preceding wave timing and delayed wave timing to the outside. As described above, the timing estimation unit estimates the preceding wave arrival timing and the delayed wave arrival timing, based on the first reliability values, the second reliability values, and the third reliability values.

As described above, in the second embodiment, in addition to the detection using the first reliability values as with the first embodiment, the preceding wave timing and the delayed wave timing are estimated using the second reliability values corresponding to the n taps at the tail end of the M taps and the third reliability values corresponding to the n taps at the leading end of the M taps. Consequently, the same effects as those of the first embodiment can be obtained, and an improvement in instantaneous estimation accuracy can be expected compared to the first embodiment.

In the present embodiment, the delayed wave timing is determined based on the second reliability values, and the preceding wave timing is determined based on the third reliability values. Alternatively, one of the delayed wave timing and the preceding wave timing may be determined by the same method as that of the first embodiment. If the timing estimation device 100a determines the delayed wave timing by the same method as that of the first embodiment, it does not need to include the M-tap replica generation unit 26, the reliability value calculation unit 28, and the reliability value clipping unit 24-2. If the timing estimation device 100a determines the preceding wave timing by the same method as that of the first embodiment, it does not need to include the n-tap CIR estimation unit 25, the n-tap replica generation unit 27, the reliability value calculation unit 29, and the reliability value clipping unit 24-3.

Third Embodiment

Figure 12:
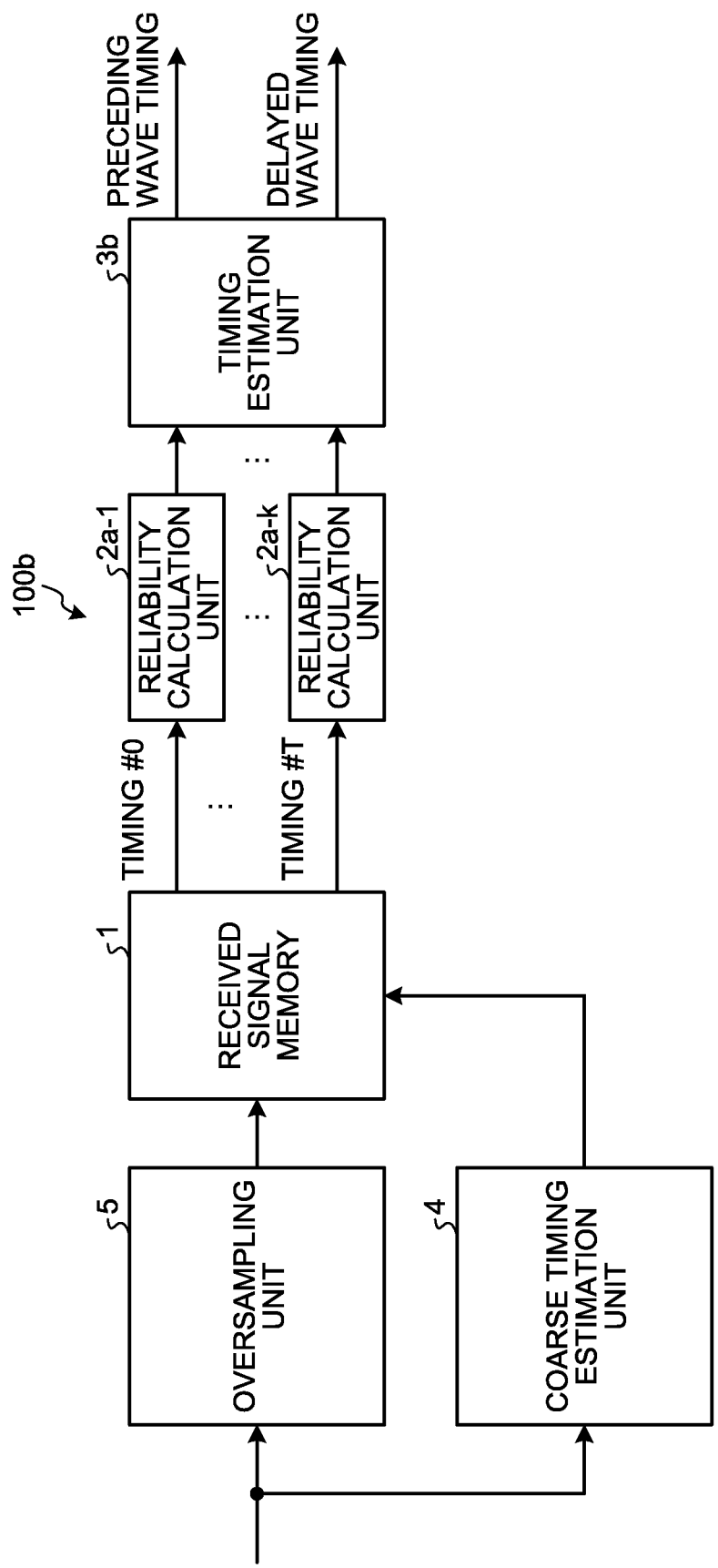
FIG. 12 is a diagram illustrating a configuration example of a timing estimation device in a third embodiment.

FIG. 12 is a diagram illustrating a configuration example of a timing estimation device of a third embodiment according to the present invention. A timing estimation device 100b of the third embodiment is equal to the timing estimation device 100a of the second embodiment except that the device has a timing estimation unit 3b in place of the timing estimation unit 3a of the second embodiment, and additionally has the coarse timing estimation unit 4 as with the first embodiment. The same reference symbols as those in the first or second embodiment are assigned to components having the same functions as those of the first or second embodiment to omit redundant explanations. Hereinafter, differences from the first or second embodiment will be mainly described.

The components constituting the timing estimation device 100b of the present embodiment are implemented by a processing circuit. As described in the first embodiment, the processing circuit may be the processing circuit 200 that is a dedicated circuit, or may be the processing circuit 300 including the processor 301, or may include both the processing circuit 200 and the processing circuit 300.

In the present embodiment, $t_s$ is inputted from the coarse timing estimation unit 4 to the received signal memory 1 as in the first embodiment, and the received signal memory 1 outputs oversampled signals to the reliability calculation units 2a-1 to 2a-k, using $t_s$ as in the first embodiment.

The configuration and operation of the reliability calculation units 2a are the same as those in the second embodiment. The reliability calculation units 2a-1 to 2a-k output, to the timing estimation unit 3b, first reliability values, second reliability values, and third reliability values that have been subjected to clipping.

Figure 13:
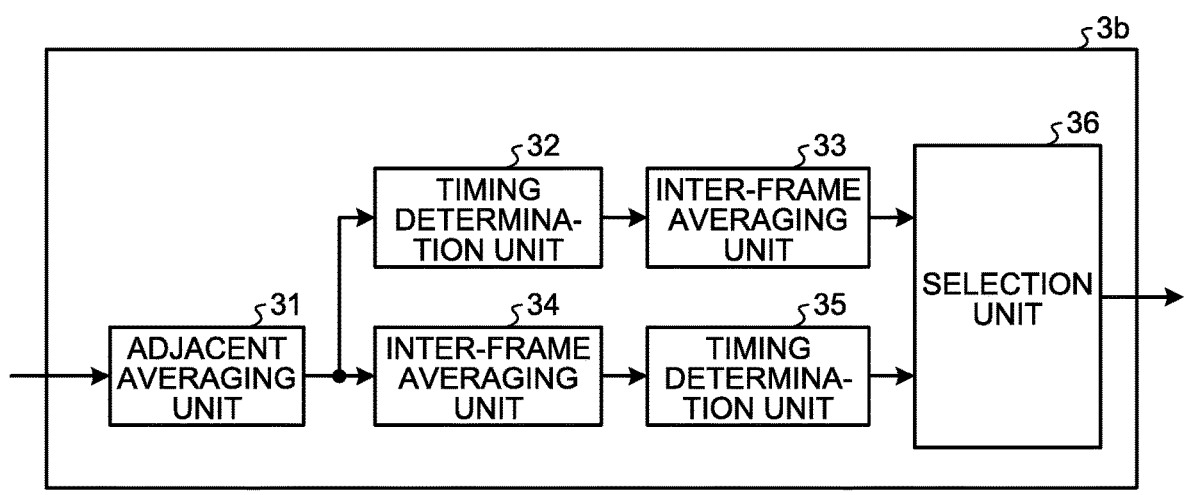
FIG. 13 is a diagram illustrating a configuration example of a timing estimation unit in the third embodiment.

FIG. 13 is a diagram illustrating a configuration example of the timing estimation unit 3b of the third embodiment. As illustrated in FIG. 13, the timing estimation unit 3b includes the adjacent averaging unit 31, the timing determination unit 32, and the inter-frame averaging unit 33 as with the first embodiment. The timing estimation unit 3b further includes the inter-frame averaging unit 34 and the timing determination unit 35 as with the second embodiment. The timing estimation unit 3b further includes a selection unit 36.

The operations of the adjacent averaging unit 31, the timing determination unit 32, and the inter-frame averaging unit 33 are the same as those in the first embodiment. The adjacent averaging unit 31 outputs the results of the adjacent averaging processing to both the timing determination unit 32 and the inter-frame averaging unit 34. The inter-frame averaging unit 33 outputs processing results, that is, a preceding wave timing and a delayed wave timing to the selection unit 36. The operations of the inter-frame averaging unit 34 and the timing determination unit 35 are the same as those in the second embodiment. The timing determination unit 35 outputs processing results, that is, a preceding wave timing and a delayed wave timing to the selection unit 36.

The selection unit 36 selects one of first estimation results that are the processing results outputted from the inter-frame averaging unit 33 and second estimation results that are the processing results outputted from the timing determination unit 35, and outputs the selected one. Specifically, for example, the selection unit 36 determines delayed wave spreads from the processing results outputted from the inter-frame averaging unit 33 and the timing determination unit 35, and selects and outputs the processing results with a larger delayed wave spread as estimation results. A delayed wave spread means the length between the timing at which a preceding wave has arrived and the timing at which a most-delayed wave has arrived. As described in the first embodiment, a delayed wave timing outputted as a processing result indicates that it has been detected at the tail end of the M taps. Thus, using a delayed wave timing and a preceding wave timing outputted as processing results, the delayed wave spread can be calculated by the following formula (3). This example is based on the assumption that the delayed wave timing and the preceding wave timing are indicated by the above-described timing numbers.

$$\text{Delayed wave spread} = \text{delayed wave timing} - \text{preceding wave timing} + (M-1) \times N \quad (3)$$

As described in the first embodiment, the timing estimation device 100b may be configured not to include the adjacent averaging unit 31. When the timing estimation device 100b does not include the adjacent averaging unit 31, the clipped first reliability values, second reliability values, and third reliability values outputted from the reliability calculation units 2a-1 to 2a-k are directly inputted to the timing determination unit 32 and the inter-frame averaging unit 34.

As described above, the timing estimation device 100b selects and outputs one of the first estimation results that are the preceding wave arrival timing and the delayed wave arrival timing calculated without using the second reliability values and the third reliability values as in the method described in the first embodiment, and the second estimation results that are the preceding wave arrival timing and the delayed wave arrival timing calculated using the second reliability values and the third reliability values as in the method described in the second embodiment. In the above example, either the processing results output from the inter-frame averaging unit 33 or the processing results output from the timing determination unit 35 are selected, based on the delayed wave spreads. Alternatively, the timing estimation device 100b may be configured to be able to set which to select depending on a parameter. As for whether to use the first estimation results or the second estimation results in a setting, the setting can be realized depending on an expected propagation environment, for example, but a setting method therefor is not limited to this realization manner.

As described above, the timing estimation device 100b of the third embodiment uses the processing in the timing estimation unit 3 of the first embodiment in combination with the processing in the timing estimation unit 3a of the second embodiment, and selects a result outputted from the processing results of them. The first embodiment is lower in instantaneous estimation accuracy than the second embodiment, but in an environment with less fluctuation, higher in the accuracy of timing estimation than the second embodiment by virtue of the averaging in the inter-frame averaging. The third embodiment can select the processing results of the first embodiment in an environment with less fluctuation, and select the second embodiment when the propagation environment changes suddenly, for example, on occasions of the entrance or exit of a tunnel. By doing so, the third embodiment can strengthen resistance to fluctuations in a propagation environment while maintaining the accuracy of timing estimation in an environment with less fluctuation.

Fourth Embodiment

Figure 14:
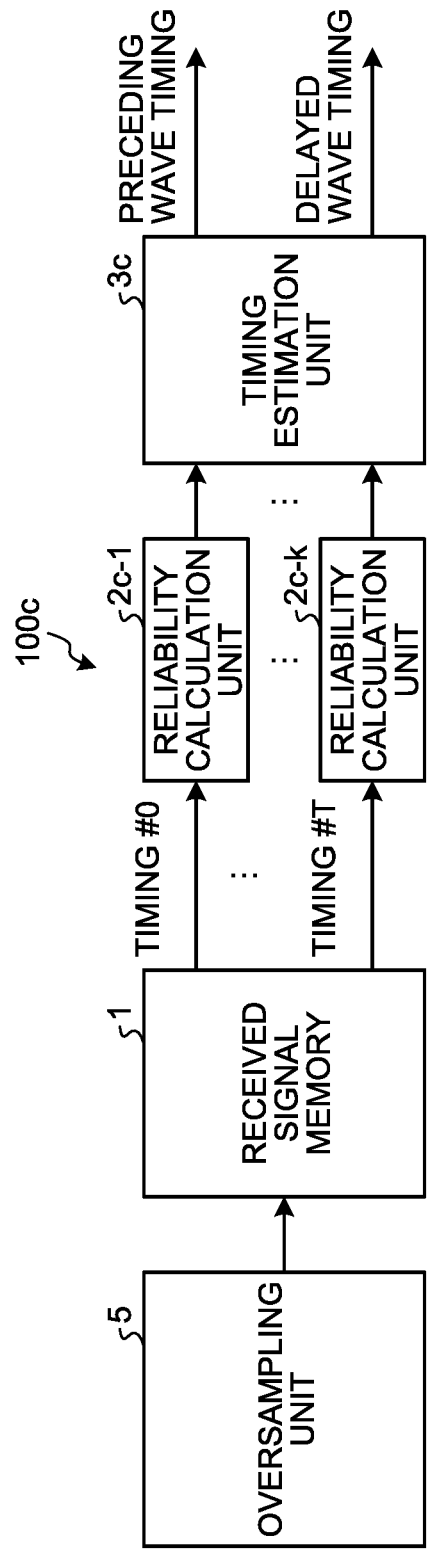
FIG. 14 is a diagram illustrating a configuration example of a timing estimation device in a fourth embodiment.

FIG. 14 is a diagram illustrating a configuration example of a timing estimation device in a fourth embodiment of the present invention. A timing estimation device 100c of the fourth embodiment is equal to the timing estimation device 100a of the second embodiment except that the device 100c includes reliability calculation units 2c-1 to 2c-k and a timing estimation unit 3c in place of the reliability calculation units 2a-1 to 2a-k and the timing estimation unit 3a of the second embodiment. The same reference symbols as those in the first or second embodiment are assigned to components having the same functions as those of the first or second embodiment to omit redundant explanations. Hereinafter, differences from the first or second embodiment will be mainly described.

The components constituting the timing estimation device 100c of the present embodiment are implemented by a processing circuit. As described in the first embodiment, the processing circuit may be the processing circuit 200 that is a dedicated circuit, or may be the processing circuit 300 including the processor 301, or may include both the processing circuit 200 and the processing circuit 300.

In the present embodiment, it is assumed that the receiving apparatus is synchronized with the transmitting apparatus, and the rough position of the known sequence is known in the receiving apparatus equipped with the timing estimation device 100c. As in the first embodiment, the received signal memory 1 outputs samples at the timings #0 to # T to the reliability calculation unit 2c-1 to 2c-k, based on $t_s$ determined from the rough position of the known sequence. Hereinafter, the reliability calculation units 2c-1 to 2c-k are described as the reliability calculation units 2c when indicated without distinction.

Figure 15:
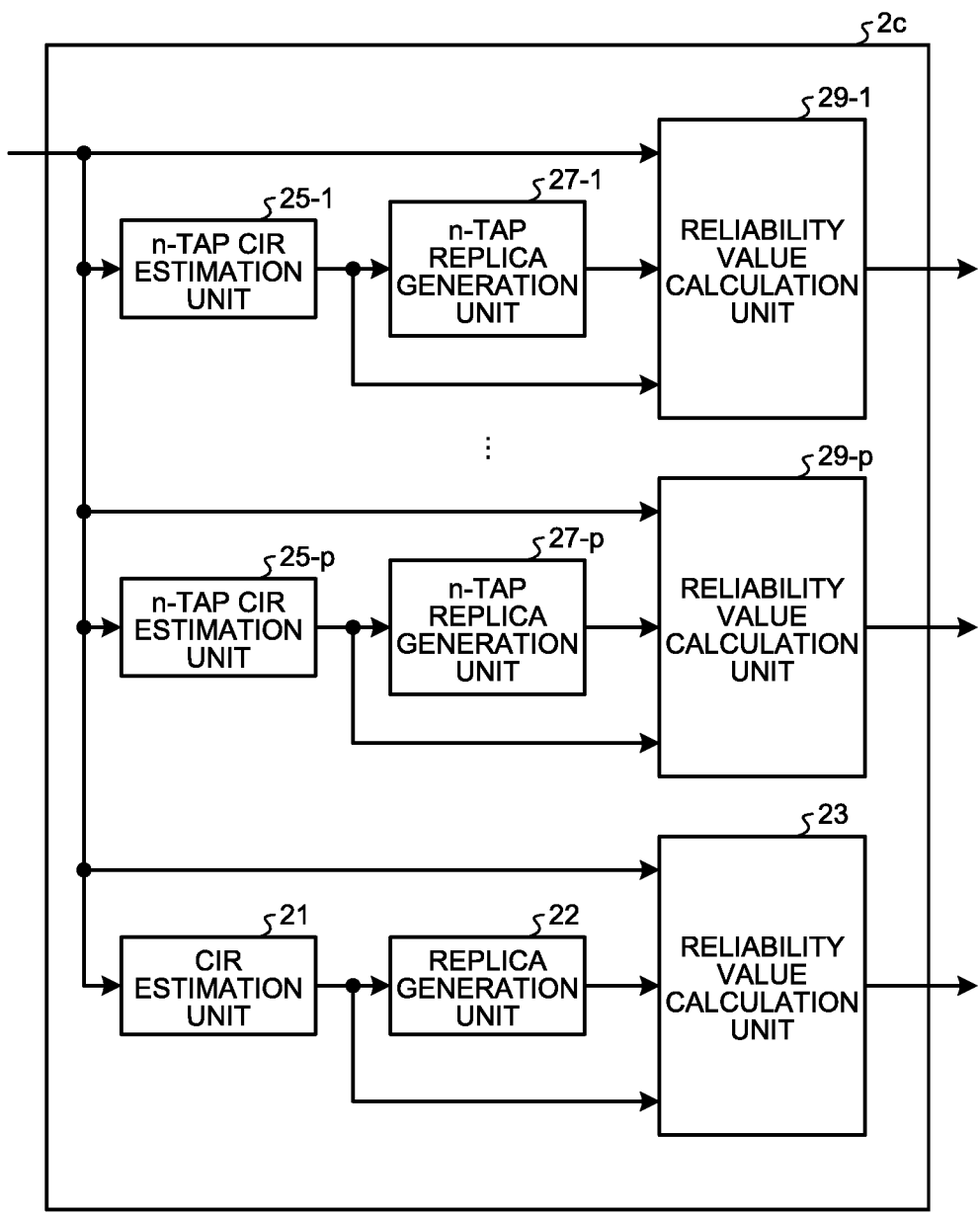
FIG. 15 is a diagram illustrating a configuration example of a reliability calculation unit in the fourth embodiment.

FIG. 15 is a diagram illustrating a configuration example of each reliability calculation unit 2c of the present embodiment. As illustrated in FIG. 15, the reliability calculation unit 2c includes the CIR estimation unit 21, the replica generation unit 22, and the reliability value calculation unit 23 as with the first embodiment. The reliability calculation unit 2c further includes n-tap CIR estimation units 25-1 to 25-p, n-tap replica generation units 27-1 to 27-p, and reliability value calculation units 29-1 to 29-p. p is an integer greater than or equal to two. Hereinafter, the n-tap CIR estimation units 25-1 to 25-p are described as n-tap CIR estimation units 25 when indicated without distinction. The n-tap replica generation units 27-1 to 27-p are described as n-tap replica generation units 27 when indicated without distinction. The reliability value calculation units 29-1 to 29-p are described as reliability value calculation units 29 when indicated without distinction.

The n-tap CIR estimation unit 25-r (r=1, . . . , p) determines the CIR for n taps based on the oversampled received signal inputted from the received signal memory 1, and outputs the determined CIR to the n-tap replica generation unit 27-r and the reliability value calculation unit 29-r. A method of calculating the CIR for the n taps may be a method using n instead of M in the CIR described in the first embodiment, or may be a method different from the method described in the first embodiment. However, the value of the number of taps, n in the n-tap CIR estimation units 25-1 to 25-p differs among the n-tap CIR estimation units 25-1 to 25-p. Hereinafter, the values of n that are the numbers of taps in the n-tap CIR estimation units 25-1 to 25-p, and are third numbers are referred to as $n_1$ to $n_p$. $n_1$ to $n_p$ are positive integers smaller than M.

The n-tap replica generation unit 27-r (r=1, . . . , p) generates a replica of the received signal using the CIR outputted from the n-tap CIR estimation unit 25-r, and outputs the replica to the reliability value calculation unit 29-r. The replica may be generated using the same method as that of the first embodiment, but is not limited to this method.

The reliability value calculation unit 29-r calculates a reliability value based on the replica, the oversampled received signal, and the CIR, and outputs the reliability value to the timing estimation unit 3c. The reliability value may be calculated using the same method as that of the first embodiment, but is not limited to this method.

As described above, the timing estimation device 100c of the present embodiment includes two or more sets of the n-tap CIR estimation unit 25 that is the second estimation unit, the n-tap replica generation unit 27 that is the third replica generation unit, and the reliability value calculation unit 29 that is the third calculation unit. The third number, n, is different among the two or more sets.

Figure 16:
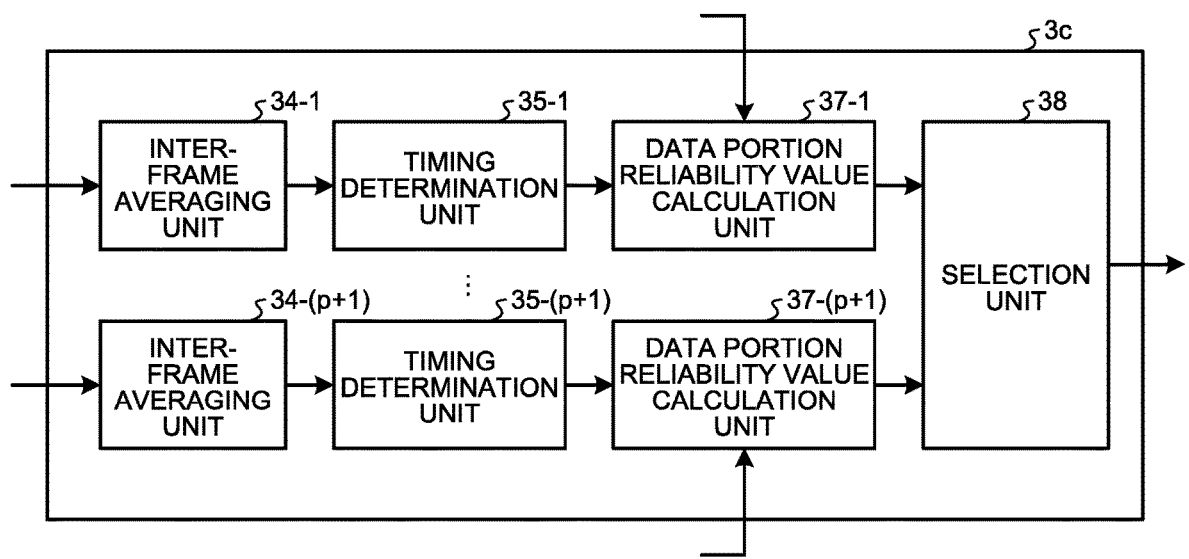
FIG. 16 is a diagram illustrating a configuration example of a timing estimation unit in the fourth embodiment.

FIG. 16 is a diagram illustrating a configuration example of the timing estimation unit 3c of the fourth embodiment. As illustrated in FIG. 16, the timing estimation unit 3c includes inter-frame averaging units 34-1 to 34-(p+1), timing determination units 35-1 to 35-(p+1), data portion reliability value calculation units 37-1 to 37-(p+1), and a selection unit 38. The inter-frame averaging units 34-1 to 34-p receive reliability values calculated by the reliability value calculation units 29-1 to 29-p. The inter-frame averaging unit 34-(p+1) receives a reliability value calculated by the reliability value calculation unit 23.

Processing in the inter-frame averaging units 34-1 to 34-(p+1) is the same as the processing in the inter-frame averaging unit 34 of the second embodiment. The inter-frame averaging units 34-1 to 34-(p+1) output processing results to their respective timing determination units 35-1 to 35-(p+1). Processing in the timing determination units 35-1 to 35-(p+1) is the same as the processing in the timing determination unit 35 of the second embodiment. The timing determination units 35-1 to 35-(p+1) output processing results, that is, preceding wave timings and delayed wave timings to their respective data portion reliability value calculation units 37-1 to 37-(p+1).

The data portion reliability value calculation units 37-1 to 37-(p+1) perform symbol determination on a data portion of the received signal, that is, a portion other than the known sequence in a frame, using the preceding wave timings and the delayed wave timings inputted from the corresponding timing determination units 35-1 to 35-(p+1). For the symbol determination, commonly used methods can be used, and any method thereof may be used. The received signal is an oversampled received signal inputted from the received signal memory 1 to the data portion reliability value calculation units 37-1 to 37-(p+1). The data portion reliability value calculation units 37-1 to 37-(p+1) calculate a reliability value of the data portion based on the symbol determination result and the received signal, and output the reliability value together with the preceding wave timing and the delayed wave timing to the selection unit 38. For the reliability values of the data portion, a method using a known sequence and a received signal in the first embodiment may be used, but the present invention is not limited to this method.

The selection unit 38 selects and outputs the preceding wave timing and the delayed wave timing that correspond to the largest reliability value of the reliability values inputted from the data portion reliability value calculation units 37-1 to 37-(p+1). Specifically, the timing estimation unit 3c calculates, as first estimated timings, the preceding wave arrival timings and the delayed wave arrival timings on the basis of the third reliability values calculated by the plurality of sets each constituted by the n-tap CIR estimation unit 25, the n-tap replica generation unit 27, and the reliability value calculation unit 29. The timing estimation unit 3c calculates, as second estimated timings, the preceding wave arrival timing and the delayed wave arrival timing based on the first reliability values. Then, the timing estimation unit 3c outputs, as estimation results, the preceding wave arrival timing and the delayed wave arrival timing selected from among the second estimated timings and the first estimated timings.

As described above, in the fourth embodiment, reliability values based on a plurality of tap numbers are calculated, and a preceding wave timing and a delayed wave timing are selected based on reliability values of a data portion. Consequently, the same effects as those of the first embodiment can be obtained, and the estimation accuracy is greatly improved even in an environment where there are momentary fluctuations. Therefore, even when a sufficient number of times of inter-frame averaging cannot be obtained, such as when burst reception is performed, the accuracy of timing estimation can be increased.

<Modification>

In the above-described embodiments, description has been given for an example in which the reliability calculation units corresponding to the timings #0 to # T are provided to execute the processing on a plurality of timings in parallel, but the present invention is not limited to this example, and one or more reliability calculation units may serially execute the processing corresponding to a plurality of timings. For example, one reliability calculation unit may serially execute the processing corresponding to the timings #0 to # T. In the fourth embodiment, the processing in each reliability calculation unit 2c and the processing in the timing estimation unit 3c are performed in parallel for each of the numbers of taps, but these processings may be performed serially.

Whether the clipping processing by the reliability value clipping units 24 and 24-1 to 24-3 is executed may be set by a parameter. Whether or not each of the functions of the inter-frame averaging units 33, 34, and 34-1 to 34-(p+1) and the adjacent averaging unit 31 is enabled or disabled, that is, whether or not averaging in the adjacent averaging unit 31 is executed may be set by a parameter. The configuration may be made such that the number of times of averaging in the inter-frame averaging units 33, 34, and 34-1 to 34-(p+1), that is, the number of frames to be the basis for the calculation of average values calculated by the inter-frame averaging units 33, 34, and 34-1 to 34-(p+1) can be changed by a parameter. The accuracy of the timing estimation is improved when the number of times of the inter-frame averaging is increased, but the convergence speed of the processing is increased when the number of times of the inter-frame averaging is reduced. Therefore, for example, the number of times of the inter-frame averaging is preset based on a trade-off between estimation accuracy and convergence speed. The parameters can be set by any method, and this setting is not limited to the above-described example.

In the first and third embodiments, description has been given for the example of using the coarse timing estimation unit 4, but in the configurations and operations of the first and third embodiments, $t_s$ may be set to zero without using the coarse timing estimation unit 4 as with the second embodiment. The coarse timing estimation unit 4 may be added to the configurations of the second and fourth embodiments so that the received signal memory 1 outputs an oversampled received signal using a rough position estimated by the coarse timing estimation unit 4 as with the first embodiment.

The configurations described in the above embodiments illustrate examples of the subject matter of the present invention, and can be combined with other publicly known arts and partly omitted and/or modified without departing from the scope of the present invention.

REFERENCE SIGNS LIST

1 received signal memory; 2, 2-1 to 2-k, 2a, 2a-1 to 2a-k, 2c, 2c-1 to 2c-k reliability calculation unit; 3, 3a, 3b, 3c timing estimation unit; 4 coarse timing estimation unit; 5 oversampling unit; 21 CIR estimation unit; 22 replica generation unit; 23, 28, 29, 29-1 to 29-p reliability value calculation unit; 24, 24-1 to 24-3 reliability value clipping unit; 25, 25-1 to 25-p n-tap CIR estimation unit; 26 M-tap replica generation unit; 27, 27-1 to 27-p n-tap replica generation unit; 31 adjacent averaging unit; 32, 35, 35-1 to 35-(p+1) timing determination unit; 33, 34, 34-1 to 34-(p+1) inter-frame averaging unit; 36, 38 selection unit; 37-1 to 37-(p+1) data portion reliability value calculation unit; 100, 100a, 100b, 100c timing estimation device.

The invention claimed is:

1. A timing estimation device comprising:
    a received signal memory to output a plurality of sample groups each of which is formed of a first number of samples extracted at symbol rate intervals from an oversampled received signal containing a known sequence, with shifting leading positions of the sample groups by one sample each;
    a reliability calculator to calculate a channel impulse response for each of the plurality of sample groups, based on the sample group, generate a replica of the received signal using the channel impulse response and the known sequence, and calculate a reliability value based on the sample group, the replica, and the channel impulse response; and
    a timing estimator to estimate a preceding wave arrival timing and a delayed wave arrival timing based on the reliability value.

2. The timing estimation device according to claim 1, wherein
    the reliability calculator comprises:
    a first estimator to calculate the channel impulse response for a second number of taps from the sample group;
    a first replica generator to generate a first replica that is the replica, using the channel impulse response for the second number of taps and the known sequence; and
    a first calculator to calculate an error power based on the sample group and the replica, calculate power of the channel impulse response based on the channel impulse response for the second number of taps, and calculate a first reliability value that is the reliability value based on the error power and the power of the channel impulse response.

3. The timing estimation device according to claim 2, wherein
the reliability calculator further comprises:
a second replica generator to generate a second replica that is the replica, using the channel impulse response corresponding to a third number of taps at a tail end of the second number of taps, of the channel impulse response for the second number of taps; and
a second calculator to calculate an error power based on the sample group and the second replica, calculate a power of the channel impulse response corresponding to the third number of taps at the tail end of the second number of taps, based on the channel impulse response corresponding to the third number of taps at the tail end of the second number of taps, and calculate a second reliability value that is the reliability value, based on the calculated error power and the calculated power of the channel impulse response corresponding to the third number of taps at the tail end of the second number of taps, and
the timing estimator estimates the preceding wave arrival timing and the delayed wave arrival timing, based on the first reliability value and the second reliability value.

4. The timing estimation device according to claim 2, wherein
the reliability calculator further comprises:
a second estimator to calculate the channel impulse response for a third number of taps from the sample group;
a third replica generator to generate a third replica that is the replica, using the channel impulse response for the third number of taps and the known sequence; and
a third calculator to calculate an error power based on the sample group and the third replica, calculate a power of the channel impulse response for the third number of taps, based on the channel impulse response for the third number of taps, and calculate a third reliability value that is the reliability value, based on the calculated error power and the calculated power of the channel impulse response for the third number of taps, and
the preceding wave arrival timing and the delayed wave arrival timing are estimated, based on the first reliability values and the third reliability values.

5. The timing estimation device according to claim 3, wherein
the reliability calculator further comprises:
a second estimator to calculate the channel impulse response for the third number of taps from the sample group;
a third replica generator to generate a third replica that is the replica, using the channel impulse response for the third number of taps and the known sequence; and
a third calculator to calculate an error power based on the sample group and the third replica, calculate a power of the channel impulse response for the third number of taps, based on the channel impulse response for the third number of taps, and calculate a third reliability value that is the reliability value, based on the calculated error power and the calculated power of the channel impulse response for the third number of taps, and
the timing estimator estimates the preceding wave arrival timing and the delayed wave arrival timing, based on the first reliability value, the second reliability value, and the third reliability value.

6. The timing estimation device according to claim 5, wherein one of first estimation results that are the preceding wave arrival timing and the delayed wave arrival timing calculated without using the second reliability value and the third reliability value, and second estimation results that are the preceding wave arrival timing and the delayed wave arrival timing calculated using the second reliability value and the third reliability value is selected and outputted.

7. The timing estimation device according to claim 6, wherein of the first estimation results and the second estimation results, one that has a larger delayed wave spread that is a length between the preceding wave arrival timing and the delayed wave arrival timing is selected as estimation results.

8. The timing estimation device according to claim 1, wherein the reliability calculator performs clipping processing to output a threshold as the reliability value to the timing estimator when the generated reliability value exceeds the threshold.

9. The timing estimation device according to claim 8, wherein whether or not to execute the clipping processing can be set by a parameter.

10. The timing estimation device according to claim 1, wherein the timing estimator averages the reliability value and an adjacent reliability value corresponding to an adjacent sample group that is the sample group shifted by one sample from the sample group corresponding to the reliability value, and estimates the preceding wave arrival timing and the delayed wave arrival timing based on a value obtained by the averaging.

11. The timing estimation device according to claim 10, wherein whether or not to perform the averaging can be set by a parameter.

12. The timing estimation device according to claim 1, wherein the timing estimator estimates the preceding wave arrival timing and the delayed wave arrival timing for each frame, and outputs average values of the preceding wave arrival timings and the delayed wave arrival timings for a plurality of frames as estimation results.

13. The timing estimation device according to claim 12, wherein the number of frames to be a basis for calculation of the average value can be set by a parameter.

14. The timing estimation device according to claim 2, wherein
the reliability calculator further comprises a plurality of sets of:
a second estimator to calculate the channel impulse response of a third number of taps from the sample group;
a third replica generator to generate a third replica that is the replica, using the channel impulse response for the third number of taps and the known sequence; and
a third calculator to calculate an error power based on the sample group and the third replica, calculate a power of the channel impulse response for the third number of taps, based on the channel impulse response for the third number of taps, and calculate a third reliability value that is the reliability value, based on the calculated error power and the calculated power of the channel impulse response for the third number of taps, the third number is different among the sets, and the timing estimator calculates the preceding wave arrival timings and the delayed wave arrival timings as first estimated timings, based on the third reliability values calculated by the third calculators of the sets, calculates the preceding wave arrival timing and the delayed wave arrival timing as second estimated timings, based on the first reliability values, and outputs the preceding wave arrival timing and the delayed wave arrival timing selected from among the second estimated timings and the first estimated timings, as estimation results.

15. The timing estimation device according to claim 14, wherein the timing estimator selects, as one of the estimation results, the delayed wave arrival timing corresponding to the largest value of the third reliability values and the first reliability values.

16. A timing estimation method performed by a timing estimation device, comprising:

an output step of outputting a plurality of sample groups each of which is a first number of samples extracted at symbol rate intervals from an oversampled received signal containing a known sequence, with shifting leading positions of the sample groups by one sample from each other;

a generation step of calculating a channel impulse response for each of the sample groups, based on the sample group, and generating a replica of the received signal using the channel impulse response and the known sequence;

a calculation step of calculating a reliability value based on the sample group, the replica, and the channel impulse response; and an estimation step of estimating a preceding wave arrival timing and a delayed wave arrival timing, based on the reliability value.

* * * * *